July 5, 1927.
D. RICH
NUT LOCK
Filed Oct. 19, 1926
1,634,629
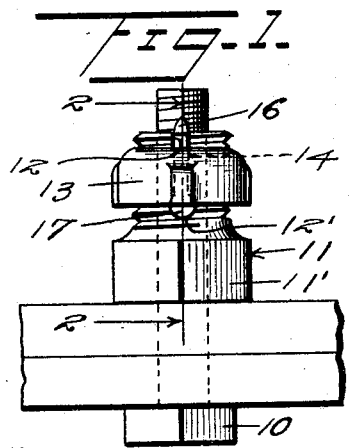
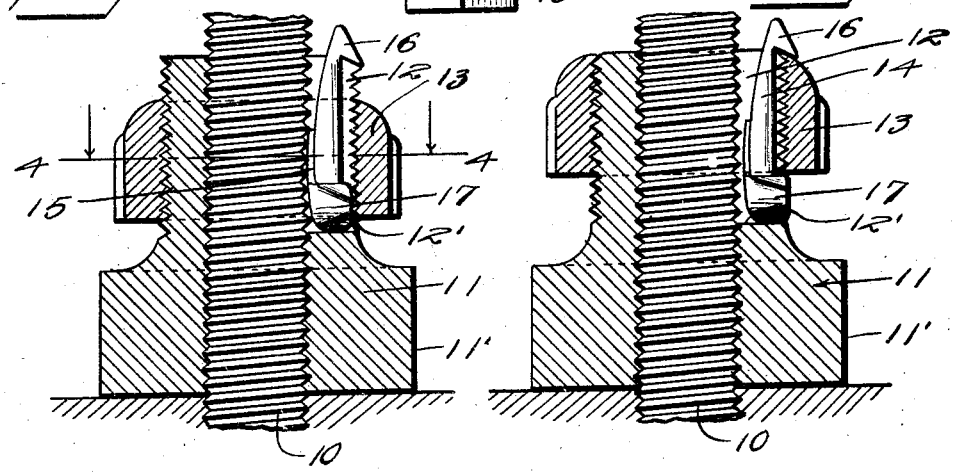
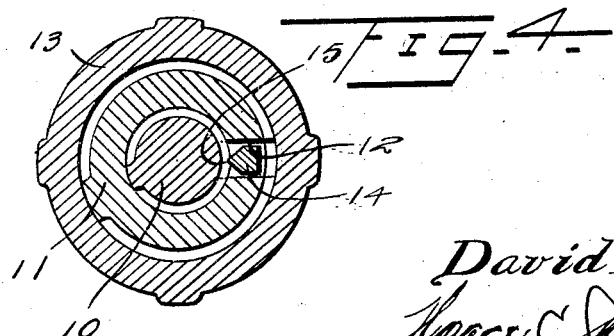
Inventor
David Rich.
By
Attorney Patented July 5, 1927.

1,634,629

UNITED STATES PATENT OFFICE.

DAVID RICH, OF SPOONER, WISCONSIN, ASSIGNOR OF ONE-HALF TO JOHN W. HENDRICKSON, OF SPOONER, WISCONSIN.

NUT LOCK.

Application filed October 19, 1926. Serial No. 142,699.

This invention relates to new and useful improvements in locking devices, and particularly to locking devices for nuts and bolts.

One object of the invention is to provide a locking device for a nut and bolt which automatically locks the nut and bolt together, and which automatically releases itself when properly manipulated.

Another object is to provide a locking device for a lock nut which is forced into interlocking engagement with the nut and bolt, when the lock nut is driven home, and which is automatically released from the bolt, when the locking nut is unscrewed.

Other objects and advantages will be apparent from the following description when taken in connection with the accompanying drawing.

In the drawing:

Figure 1 is an elevation of the invention, applied to a nut and bolt.

Figure 2 is a vertical longitudinal sectional view on the line 2—2 of Figure 1, in locked position.

Figure 3 is a similar sectional view showing the parts in unlocked position, so that the main nut may be loosened or tightened on the bolt.

Figure 4 is a horizontal sectional view on the line 4—4 of Figure 2.

Referring particularly to the accompanying drawing, 10 represents a bolt, and 11 the nut engaged thereon, in connection with which the present invention is adapted for use, said nut having a wrench engaging portion 11′.

Formed longitudinally of the threaded portion of the nut is an open ended slot 12, said slot opening through the nut to the interior threaded opening and the externally threaded outer face. The end of the slot, adjacent the wrench engaging portion is formed with a circular portion 12′, as clearly seen in the drawing. Screwed onto the external threads of the nut 11 is a locking nut 13. Disposed within the slot 12 is the locking pawl or detent 14, said pawl being formed with a knife edge 15, on its bolt engaging face, a shouldered head 16, on its outer end, and an enlarged portion 17, on its other end for engagement in the circular portion of the slot. The bolt engaging face of the pawl is curved throughout its length, but only the innermost portion is provided with the knife edge, the remainder of the pawl, inwardly of the head being sufficiently thin to permit the pawl to be rocked, on the knife edge, as a fulcrum, so as to engage and disengage the knife edge, when the lock nut is screwed inwardly or outwardly.

In applying the device to the nut, the main nut is first screwed home on the bolt. The operator then inserts the pawl in the slot, and applies the locking nut to the externally threaded portion of the nut 11, and screws the same inwardly until the threads of the lock nut bite into the outer face of the enlarged portion 17 of the pawl. This engagement of the nut 13, with the enlargement, causes the pawl to be rocked to such an extent that the knife edge is forced into firm biting engagement with the threads of the bolt, while the shoulder portion of the pawl overlies the outer end of the locking nut, whereby to hold the pawl in its locked position, and the nuts and bolt against relative rotation.

When it is desired to tighten or loosen the main nut 11, the operator taps on the headed end of the pawl to force said pawl inwardly toward the bolt, and thereby disengage the shoulder so that the nut 13 may be backed off to the desired degree. Upon thus backing off the nut 13, the said shouldered portion of the pawl will engage in the internal threads of the nut 13, whereby to rock the pawl, and move the enlarged end outwardly, with the result that the knife edge will be released from its engagement with the threads of the bolt, and the nut 11 readily turned in the desired direction. The operator then turns the nut 13 inwardly until its inner threads bite into the enlarged portion of the pawl, thereby rocking the same into engagement with the bolt.

It will be particularly noted that the shoulder of the head of the pawl rides in the threads of the lock nut, whereby, as said nut is screwed on or off the main nut 11, the pawl is so rocked that its knife edge is held out of engagement with the threads of the bolt, thereby permitting the main nut to be turned on or off the bolt, by simply unscrewing the lock nut to a small degree, or until the said shoulder engages in the internal threads thereof.

When the locking nut has engaged the enlarged portion of the pawl and caused the knife edge to bite into the bolt, the shouldered head of the pawl overlies the lock nut, whereby when the lock nut is backed off, the shoulder will be engaged by the adjacent end of the lock nut, so that the pawl is maintained in its biting position. To completely remove the locking nut, the headed end of the pawl must be tapped inwardly toward the bolt to permit the lock nut to pass the said shoulder.

What is claimed is:

The combination with a bolt and a nut engaged thereon, the nut having an externally threaded extension, such extension having a longitudinal slot opening through the outer face of the extension and into the bore of the same, of a nut engaged on the extension and having its outer end face inclined toward the nut, and a locking member disposed longitudinally in said slot and having a terminal enlargement and a longitudinal knife edge, said knife edge being adapted to be driven into the bolt threads upon engagement of the second nut externally on said enlargement, and a nose on the locking member for engagement in the internal threads of the second nut whereby to maintain said member out of biting engagement with the bolt while said first nut is being applied or removed.

In testimony whereof, I affix my signature.

DAVID RICH.